(12) United States Patent
Hamelin et al.

(10) Patent No.: US 12,447,641 B2
(45) Date of Patent: Oct. 21, 2025

(54) WELDED RAZOR BLADE ASSEMBLIES

(71) Applicant: The Gillette Company LLC, Boston, MA (US)

(72) Inventors: Michel Denis Hamelin, West Roxbury, MA (US); Craig Stephen Vickery, Reading, MA (US)

(73) Assignee: The Gillette Company LLC, Boston, MA (US)

( * ) Notice: Subject to any disclaimer, the term of this patent is extended or adjusted under 35 U.S.C. 154(b) by 230 days.

(21) Appl. No.: 17/306,714

(22) Filed: May 3, 2021

(65) Prior Publication Data
US 2022/0347873 A1 Nov. 3, 2022

(51) Int. Cl.
*B26B 21/40* (2006.01)
*B23K 26/21* (2014.01)

(52) U.S. Cl.
CPC ...... *B26B 21/4068* (2013.01); *B26B 21/4012* (2013.01); *B23K 26/21* (2015.10)

(58) Field of Classification Search
CPC . B26B 21/40; B26B 21/4012; B26B 21/4068; B23K 26/21
See application file for complete search history.

(56) References Cited

U.S. PATENT DOCUMENTS

| | | | | |
|---|---|---|---|---|
| 4,577,088 A * | 3/1986 | Sharp | ................... | B23K 26/262 219/121.14 |
| 5,225,654 A * | 7/1993 | Harwig | .................. | B23K 10/02 219/137 R |
| 5,595,670 A * | 1/1997 | Mombo-Caristan | ... | B23K 26/26 219/121.64 |
| 7,607,230 B2 * | 10/2009 | Aviza | .................. | B26B 21/4068 30/50 |
| 8,443,519 B2 * | 5/2013 | Xu | ........................ | B26B 21/565 30/32 |
| 9,266,211 B2 * | 2/2016 | Yoshihara | ................. | B24B 9/04 |
| 9,375,802 B2 * | 6/2016 | Hosoya | ................ | B23K 10/006 |
| 11,783,727 B1 * | 10/2023 | Kelly | .................. | G06F 3/04815 |
| 11,945,130 B2 * | 4/2024 | Hamelin | ............. | B26B 21/4068 |
| 2004/0099644 A1 * | 5/2004 | Allen | .................... | B23K 26/262 219/121.64 |

(Continued)

FOREIGN PATENT DOCUMENTS

| | | |
|---|---|---|
| CN | 103495803 A | 1/2014 |
| CN | 104227236 A | 12/2014 |

(Continued)

OTHER PUBLICATIONS

The fabricator: "essential considerations for laser welding", Travis Stempky, Dec. 2, 2020.*

(Continued)

*Primary Examiner* — Jason Daniel Prone
(74) *Attorney, Agent, or Firm* — Andrés E. Velarde

(57) ABSTRACT

A razor blade assembly including: a razor blade; a blade support; and one or more weld areas joining the razor blade to the blade support, each weld area having a length and a width, in which the width is about 0.05 mm to about 0.15 mm. Also provided is a razor blade assembly including: a razor blade; a blade support; and one or more weld areas joining the razor blade to the blade support, each weld area including a depth and a width, in which the depth is about 0.10 mm to about 0.20 mm.

11 Claims, 8 Drawing Sheets

(56) References Cited

U.S. PATENT DOCUMENTS

| | | | |
|---|---|---|---|
| 2012/0048837 A1 | 3/2012 | Bleicher et al. | |
| 2012/0094839 A1* | 4/2012 | Khare | B23K 26/147 505/480 |
| 2013/0134139 A1 | 5/2013 | Duerr et al. | |
| 2014/0000081 A1 | 1/2014 | Xu | |
| 2014/0003860 A1* | 1/2014 | Evangelista | B23K 26/60 219/121.64 |
| 2014/0265814 A1* | 9/2014 | Quitmeyer | H01T 21/02 445/7 |
| 2014/0312011 A1* | 10/2014 | Hosoya | B23K 10/02 219/121.45 |
| 2018/0045232 A1 | 2/2018 | Capostagno et al. | |
| 2018/0117707 A1* | 5/2018 | Fujiwara | B23K 26/322 |
| 2018/0245616 A1 | 8/2018 | Kumazawa et al. | |
| 2018/0281111 A1 | 10/2018 | Kassai et al. | |
| 2020/0221605 A1 | 7/2020 | Vanderwees | |
| 2020/0230837 A1* | 7/2020 | Schizas | B26B 21/4012 |
| 2021/0031387 A1 | 2/2021 | Paspatis | |
| 2021/0146561 A1 | 5/2021 | Bozikis | |
| 2021/0205925 A1 | 7/2021 | Hara et al. | |
| 2022/0001561 A1 | 1/2022 | Davos et al. | |
| 2022/0314476 A1 | 10/2022 | Zografos et al. | |
| 2022/0347875 A1* | 11/2022 | Hamelin | B26B 21/4068 |

FOREIGN PATENT DOCUMENTS

| | | | | |
|---|---|---|---|---|
| CN | 103495803 B | | 9/2015 | |
| CN | 107708914 A | | 2/2018 | |
| CN | 209349695 U | | 9/2019 | |
| DE | 102018106663 A1 | | 9/2018 | |
| EP | 3357653 A1 | | 8/2018 | |
| JP | 55161566 A | * | 12/1980 | ............... B23K 9/00 |
| JP | 60009578 A | * | 1/1985 | ............. B23K 10/02 |
| JP | 01278968 A | * | 11/1989 | ............... B23K 9/00 |
| JP | H067974 A | | 1/1994 | |
| JP | 08025053 A | * | 1/1996 | ............. B23K 10/02 |
| JP | 2002273586 A | | 9/2002 | |
| JP | 2004363378 A | | 12/2004 | |
| WO | WO-9921677 A1 | * | 5/1999 | ............. B23K 9/167 |
| WO | WO-2018227115 A1 | * | 12/2018 | ............. B23K 26/26 |
| WO | 2020115205 A1 | | 6/2020 | |
| WO | WO-2022236245 A1 | * | 11/2022 | ......... B26B 21/4068 |

OTHER PUBLICATIONS

Kawahito Y et al. "In-Process Repairing In Laser Welding of aluminium alloy sheets. A study of adaptive control based on in-process monitoring signals", Welding International, vol. 20, No. 6, Jan. 1, 2006, pp. 430-439.

PCT Search Report and Written Opinion for PCT/US2022/072040 dated Aug. 16, 2022, 13 pages.

* cited by examiner

WELDED RAZOR BLADE ASSEMBLIES

FIELD OF THE INVENTION

The invention generally relates to welded razor blade assemblies, and more particularly to razor blade assemblies made using keyhole welding and methods of making the same.

BACKGROUND OF THE INVENTION

A razor blade assembly includes a razor blade joined to a blade support, in which the blade support is used to install the razor blade assembly into a razor cartridge. In current razor blade assemblies, conduction laser welding is typically used to join the razor blade to the blade support. Conduction laser welding relies on surface heating of a part to create a molten pool of material that grows in width and depth via conduction and convection processes until the molten pool reaches an underlying substrate and creates a weld area that bonds or joins the part to the substrate.

The weld area created by conduction laser welding generally comprises a relatively shallow, rounded cross-section that gets narrower with depth. As such, these weld areas sometimes exhibit lower process margins. Obtaining a stronger weld with conduction laser welding typically requires increasing the size of the weld area, particularly the depth, which generally requires longer weld times and results in a weld area with a greater width. However, the increased heat associated with longer weld times can cause a number of process variations that result in defects, such as heat distortion of the part. In addition, obtaining good quality, consistent welds via conduction laser welding requires a relatively complex control strategy and frequent maintenance, including cleaning and inspection, sampling, and destructive testing to ensure optimal operation. These tasks result in increased cost and effort and often are not 100% effective in maintaining quality and consistency.

SUMMARY OF THE INVENTION

In accordance with an aspect of the present disclosure, a razor blade assembly is provided, which includes: a razor blade; a blade support; and one or more weld areas joining the razor blade to the blade support, each weld area having a length and a width, wherein the width is about 0.05 mm to about 0.15 mm.

In accordance with another aspect of the present disclosure, a razor blade assembly is provided, which includes: a razor blade; a blade support; and one or more weld areas joining the razor blade to the blade support, each weld area comprising a depth and a width, wherein the depth is about 0.10 mm to about 0.20 mm.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

The present disclosure relates to a keyhole welding process for forming a razor blade assembly comprising a razor blade and a blade support. As compared to a weld produced by conventional conduction laser welding techniques, a weld produced by keyhole welding is much narrower with a width that remains substantially uniform along an entire depth of the weld. The weld is also deeper relative to the width, which makes the weld stronger. The keyhole welding process is faster, requires less heat input, and generates a higher quality and more consistent weld. The keyhole welding process also tolerates more variation in laser beam parameters and eliminates many of the complex, high-maintenance mechanisms in conventional conduction laser welding machinery, which reduces costly machine downtime and failure modes.

Figure 1:
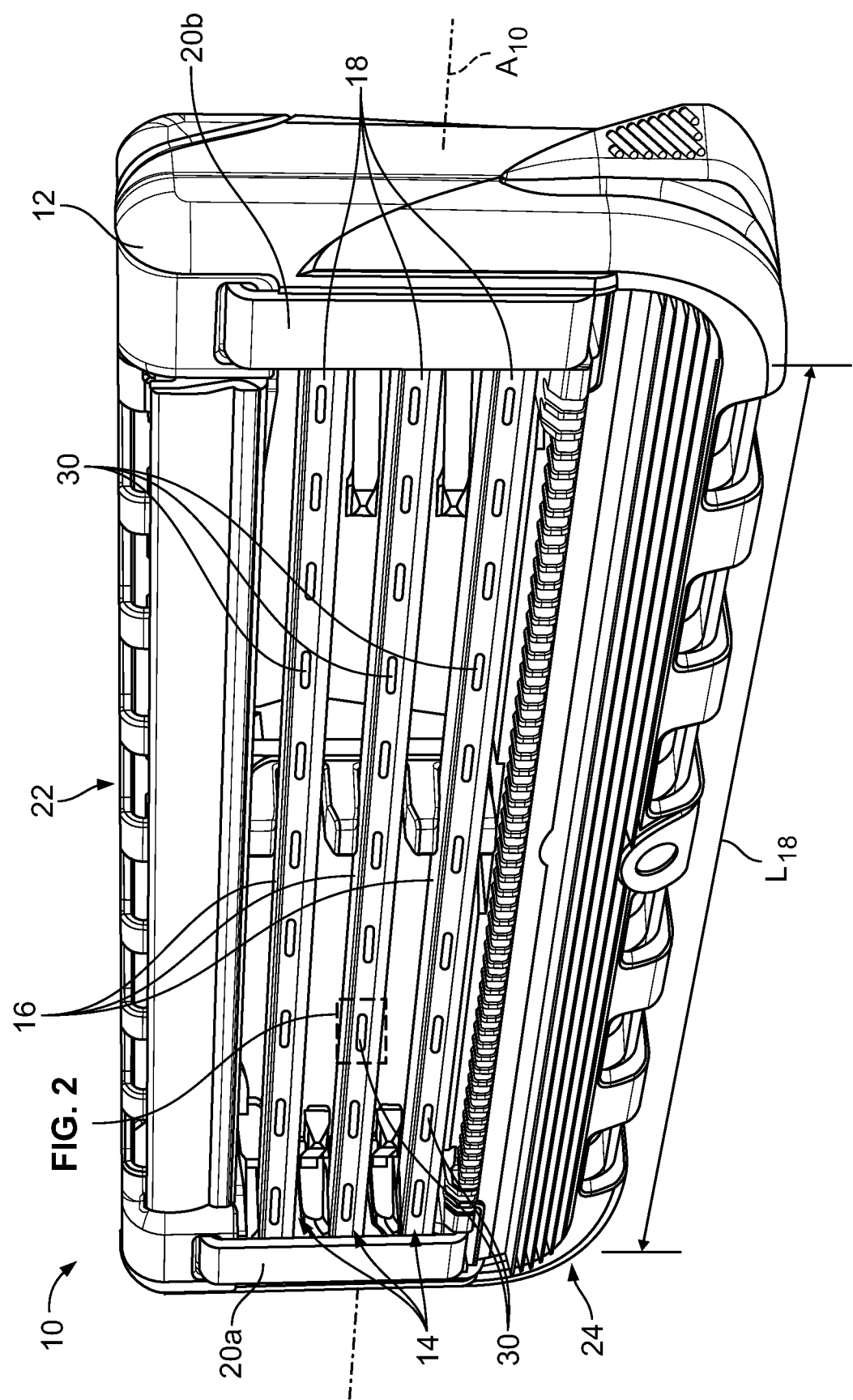
FIG. 1 is perspective view of a razor blade cartridge including a razor blade assembly, in accordance with the present disclosure.

With reference to FIG. 1, a razor cartridge 10 is shown, which may include a cartridge housing 12 having one or more razor blade assemblies 14 in accordance with the present disclosure. Although three razor blade assemblies 14 are shown in FIG. 1, it is understood that any number of razor blade assemblies 14, more or less, may be mounted within the razor cartridge 10. The razor blade assemblies 14 may each comprise a blade support 16 coupled to a razor blade 18. The razor blade assemblies 14 may be mounted within the cartridge housing 12 and secured with clips 20a and 20b as shown. The cartridge housing 12 may further comprise a cap 22 located near a back of the cartridge housing 12 and one or more guard structures 24 located near a front of the cartridge housing 12. The cap 22 may comprise one or more lubrication members (not labeled). The razor cartridge 10 may be part of a shaving razor system and may be detachably or permanently mounted to a handle (not shown). As described herein in detail, the razor blade assemblies 14 may each comprise one or more weld areas 30 joining the razor blade 18 to a respective blade support 16. Each razor blade 18 comprises a longitudinal length L is that extends in a direction parallel to a longitudinal axis $A_{10}$ of the razor cartridge 10, and each razor blade assembly 14 may comprise a plurality of weld areas 30 that are spaced apart along the longitudinal length Lis of a respective razor blade 18. In FIG. 1, it may be understood that a portion of the razor blades 18 are obscured by the clips 20a, 20b, such that the longitudinal length Lis of each razor blade 18 may be greater than that of the visible portion of the razor blade 18.

Figure 2:
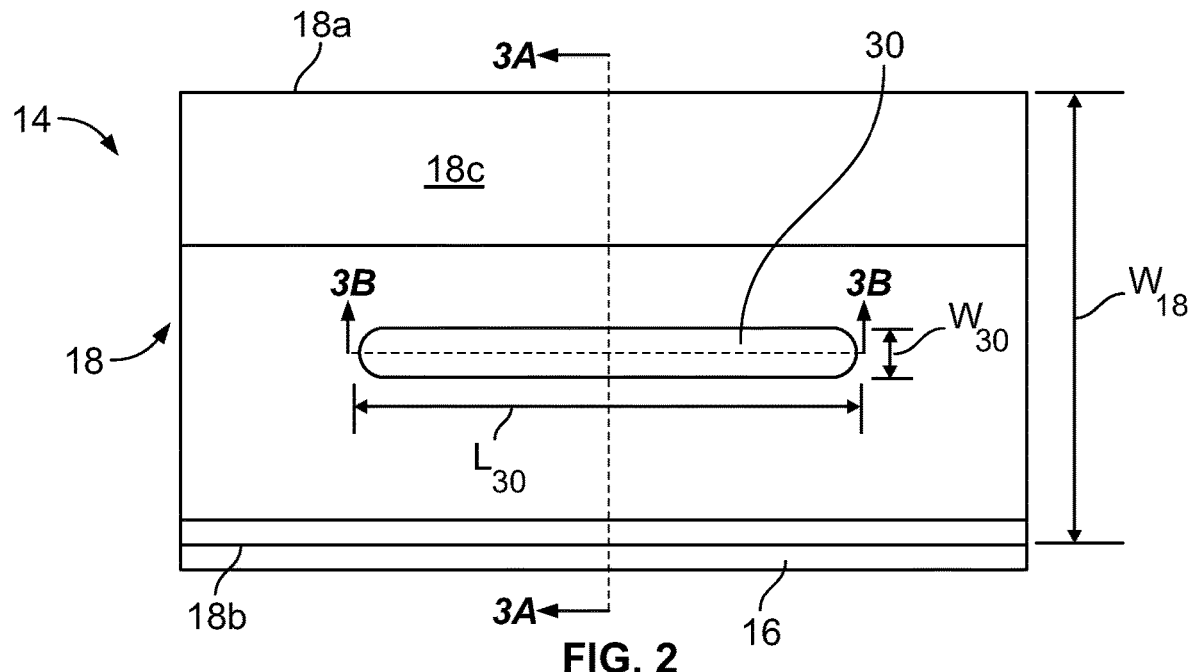
FIG. 2 is a schematic illustration of a top view of a razor blade assembly of FIG. 1 with a weld area formed using a keyhole welding process, in accordance with the present disclosure.
Figure 3A:
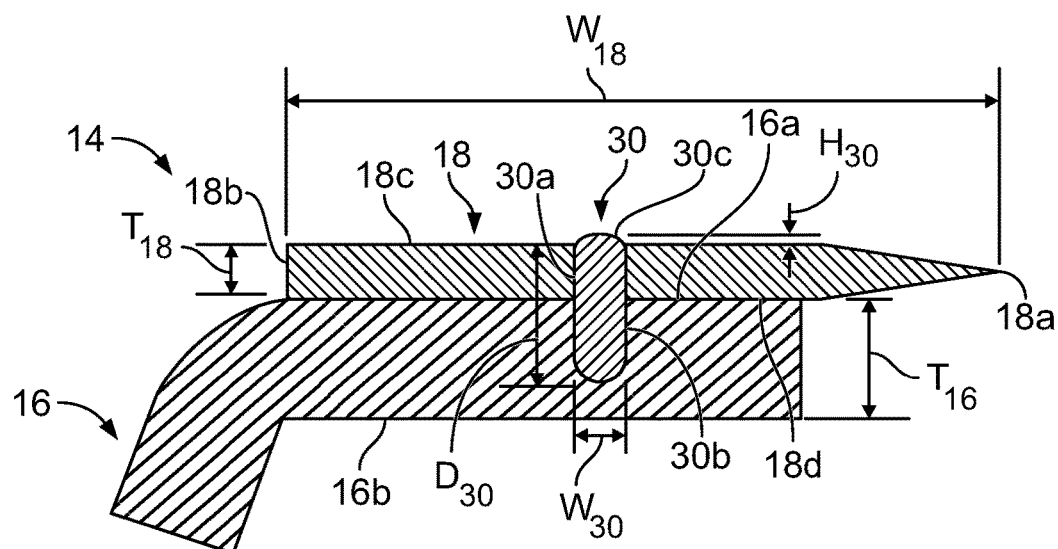
FIG. 3A is a cross-section of the razor blade assembly of FIG. 2 taken along line 3A-3A.
Figure 3B:
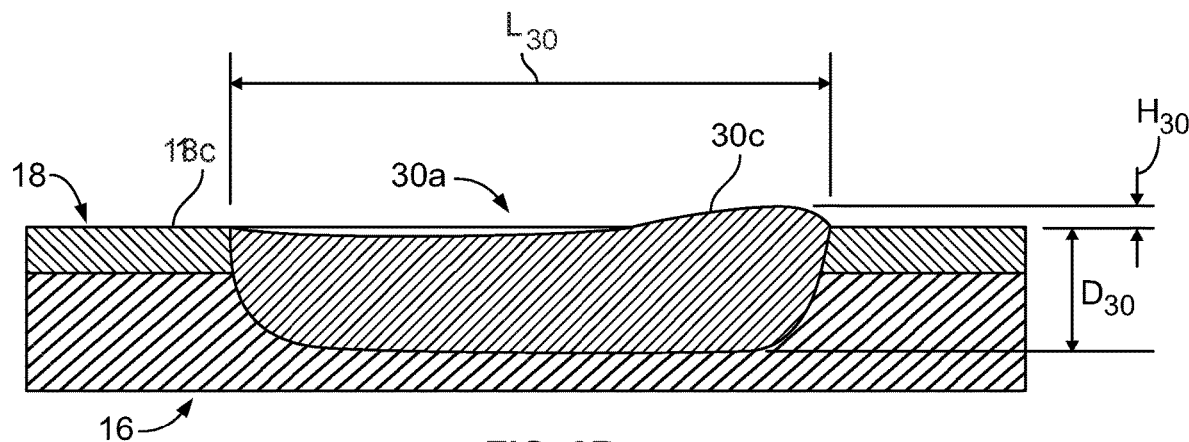
FIG. 3B is a cross-section of the razor blade assembly of FIG. 2 taken along line 3B-3B.
Figure 4:
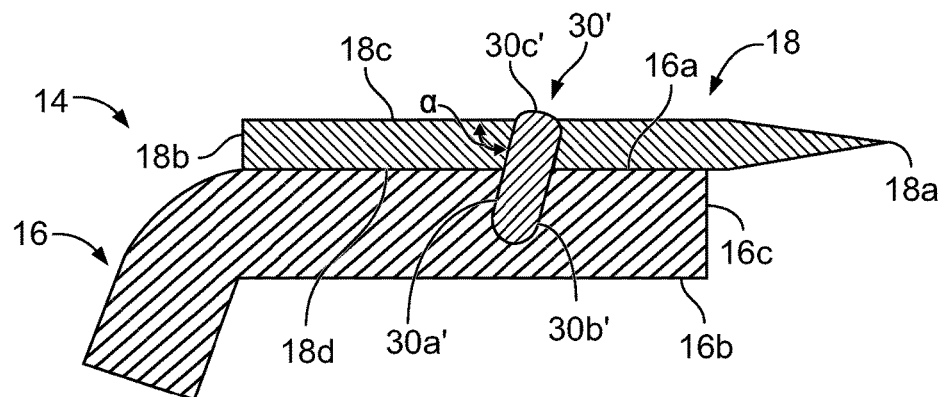
FIG. 4 is a cross-section similar to FIG. 3A illustrating an angled weld area, in accordance with the present disclosure.

FIG. 2 is a detailed top view of a weld area 30 of one of the razor blade assemblies 14 depicted in FIG. 1, and FIGS. 3A and 3B are cross-sectional views of respective portions of FIG. 2. FIG. 4 is a cross-sectional view similar to FIG. 3A of another exemplary weld area 30'. With reference to FIGS. 3A and 4, the razor blade 18 comprises a blade tip 18a, a back edge 18b, an upper surface 18c, and a lower surface 18d. The razor blade 18 may comprise a width Wig (as measured from the blade tip 18a to back edge 18b) of between about 0.20 mm to about 1.50 mm, ±0.05 mm. The razor blade 18 may comprise a thickness Tis (as measured between the upper and lower surfaces 18c, 18d) of between about 0.025 mm to about 0.125 mm, and in some examples, about 0.075, ±0.005 mm. In some examples, a portion of the razor blade 18 (e.g., a portion of the back edge 18b opposite the blade tip 18a) may be snapped or broken off following attachment to the blade support 16 to obtain the desired width Wig of the razor blade 18. The blade support 16 comprises an upper surface 16a, a lower surface 16b, and a front surface 16c. The blade support 16 may comprise a thickness $T_{16}$ (as measured between the upper and lower surfaces 16a, 16b) of between about 0.10 mm to about 0.30 mm, ±0.05 mm.

As best seen in FIGS. 1 and 2, the weld area 30 may comprise an elongated shape that extends along a portion of the longitudinal length Lis of the razor blade 18. The weld area 30 may comprise a length $L_{30}$ of about 0.25 mm to about 2.0 mm, and in some examples, about 0.70 mm, ±0.05 mm. The weld area 30 may comprise a width $W_{30}$ of about 0.05 mm to about 0.15 mm, ±0.005 mm. In some examples, the length $L_{30}$ of the weld area 30 is greater than the width $W_{30}$ to define an elongated shape, e.g., a shape in which a major axis (i.e., the axis extending along the length $L_{30}$) is greater than a minor axis (i.e., the axis extending along the width $W_{30}$). In some instances, the elongated shape may comprise substantially linear, parallel sides with rounded or curved ends to form a lozenge shape, as shown in FIGS. 1 and 2. In other instances, the elongated shape may also comprise an elliptical or oval shape in which substantially an entirety of the sides of the elongated shape are curved (not shown). In some particular examples, the weld area 30 may comprise a ratio of length:width that is greater than about 5:1, ±0.1.

As best seen in FIG. 3A, the weld area 30 extends from an upper surface 18c of the razor blade 18 into the blade support 16 to define a depth $D_{30}$ of the weld area 30. The depth $D_{30}$ may be between about 0.10 mm to about 0.20 mm, ±0.05 mm. In some examples, the weld area 30 may extend into the blade support 16 by a small amount, e.g., greater than or equal to about 5% to less than or equal to about 15%, ±1%, of the thickness $T_{16}$ of the blade support 16. In other examples, the weld area 30 may extend at least halfway through the thickness $T_{16}$ of the blade support 16, e.g., about 50% to about 75%, ±1%, of the thickness $T_{16}$ of the blade support 16. The depth $D_{30}$ of the weld area 30 may generally be greater than the width $W_{30}$. In some particular examples, the weld area 30 may comprise a ratio of depth:width that is greater than about 2:1, and in further examples, greater than about 3:1, ±0.1. As shown in FIGS. 2 and 3A, the weld area 30 may be formed at or near a centerpoint of the razor blade 18, as determined in a direction extending along the width Wig of the razor blade 18. It may be understood that the weld area 30 may also be formed at any other desired location along the width Wig of the razor blade 18, i.e., toward the blade tip 18a or the back edge 18b. As described below in more detail with respect to FIG. 4, the weld area 30 of FIG. 3A should be spaced apart from the front surface (not labeled; see 16c in FIG. 4) of the blade support 16.

In some examples, as depicted in FIG. 1, the weld areas 30 may comprise substantially similar properties (e.g., depth, width, length, location, etc.) across all of the razor blade assemblies 14, such that all weld areas 30 within the razor cartridge 10 are uniform. In other examples, the weld areas 30 of one or more of the razor blade assemblies 14 may comprise one or more different properties (e.g., depth, width, length, and/or location), as compared to the weld areas 30 in one or more of the other razor blade assemblies 14 within the razor cartridge 10. Alternatively, or in addition, one or more of the weld areas 30 within an individual razor blade assembly 14 may comprise different properties as compared to one or more other weld areas 30 within the razor blade assembly 14.

Due to the use of keyhole welding to form the weld area 30, the width $W_{30}$ of the weld area 30 may be uniform along substantially an entirety of the depth $D_{30}$ and/or length $L_{30}$ of the weld area 30. For example, the width $W_{30}$ of the weld area 30 may be uniform along greater than 80%, greater than 85%, or greater than 90% of the depth $D_{30}$ and/or length $L_{30}$ of the weld area 30. With reference to FIG. 3A, the weld area 30 may comprise a first side wall 30a and a second side wall 30b. The first and second side walls 30a, 30b, which define the width $W_{30}$ of the weld area 30, are substantially parallel to each other (e.g., ±5°). In the example shown in FIG. 3A, the first and second side walls 30a, 30b extend through the razor blade 18 and into the blade support 16 in a direction that is substantially perpendicular to the upper and lower surfaces 18c, 18d of the razor blade 18, e.g., at an angle of about 90°, ±5°, with respect to the upper and lower surfaces 18c, 18d. A portion of the first and second side walls 30a, 30b may be substantially linear. For example, as shown in FIG. 3A, a cross-sectional profile of the weld area 30 may define an elongated "U" shape, in which the portion of the first and second side walls 30a, 30b extending from the upper surface 18c of the razor blade 18 to a point near a bottom or root (not separately labeled) of the weld area 30 (e.g., where the first and second side walls 30a, 30b begin to curve toward each other) is substantially linear.

With reference to FIGS. 3A and 3B, an upper surface of the weld area 30 may define a weld face 30c, which may comprise at least a portion that extends above the upper surface 18c of the razor blade 18 by a height $H_{30}$. As best seen in FIG. 3B, the height $H_{30}$ may not be uniform across an entirety of the length $L_{30}$ of the weld area 30. In general, no point on the weld face 30c may protrude above the upper surface 18c of the razor blade 18 by more than 0.025 mm, and preferably by more than 0.0075 mm One or more parameters of the keyhole welding process may be adjusted to minimize the protrusion of the weld area 30 above the upper surface 18c of the razor blade 18.

In the example shown in FIG. 4, the weld area 30' may comprise first and second side walls 30a', 30b' that are parallel to each other but extend through the razor blade 18 (and into the blade support 16) at an acute angle α with respect to the upper surface 18c of the razor blade 18. The angle α may be between about 45° to less than about 90° or between about 50° to about 70°, ±1°. In some examples, the angle α may be about 60°, ±1°. Similar to the first and second side walls 30a, 30b of the weld area 30 in FIG. 3A, a portion of the first and second side walls 30a', 30b' of the weld area 30' in FIG. 4 may be substantially linear. Due to the angle of the first and second side walls 30a', 30b', one side wall, e.g., first side wall 30a', may be shorter than the other side wall, e.g., second side wall 30b'. While the first and second side walls 30a', 30b' are depicted in FIG. 4 as being inclined toward the blade tip 18a, it is understood that the first and second side walls 30a', 30b' could also be inclined toward the back edge 18b. The weld area 30' may otherwise comprise properties substantially similar to the weld area 30 of FIGS. 2 and 3A, including length, width, and depth (not labeled) and ratios of length:width and depth:width. As discussed above in more detail with respect to the weld area 30 in FIG. 3A, the weld area 30' in FIG. 4 may comprise a weld face 30c' that extends only slightly above the upper surface 18c of the razor blade 18, e.g., by a height (not labeled) of no more than 0.025 mm, and preferably by no more than 0.0075 mm. The blade support 16 and razor blade 18 may also comprise properties substantially similar to the blade support 16 and razor blade 18 of FIGS. 2 and 3A, including width, length, and thickness (not labeled).

The angled weld area 30' may be particularly useful when, for example, the width (not labeled; see Wig in FIG. 2) of the razor blade 18 and/or the thickness (not labeled; see $T_{16}$ in FIG. 3A) of the blade support 16 is/are at the lower end of the range(s) described herein. Forming the weld area 30' at the angle α helps to ensure that the weld area 30' penetrates sufficiently into the blade support 16 and comprises the necessary contact area between the weld area 30', razor blade 18, and blade support 16 to generate the desired weld retention strength. The weld area 30' may be formed at any desired location between the blade tip 18a and the back edge 18b of the razor blade 18, e.g., at or near a centerpoint of the razor blade 18, as discussed above with respect to the weld area 30 of FIGS. 2 and 3A. The angle α and location of the weld area 30' with respect to the blade support 16 and razor blade 18 should be selected such that the weld area 30' is spaced apart from the front surface 16c of the blade support 16, i.e., no portion of the weld area 30' should touch or extend across or beyond the front surface 16c. Contact between the weld area 30' and the front surface 16c of the blade support 16 may result in a weak weld that allows undesirable detachment of the razor blade 18 from the blade support 16.

Figure 5:
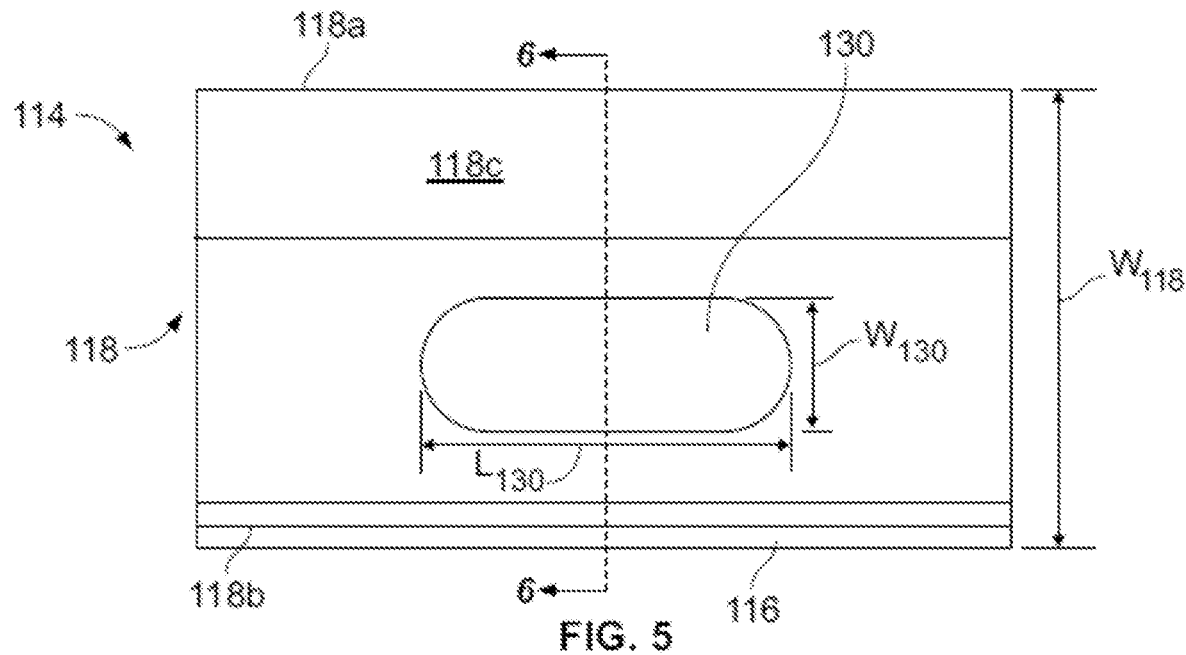
FIG. 5 is a schematic illustration of a top view of a razor blade assembly with a weld area formed using a prior art conduction laser welding process.
Figure 6:
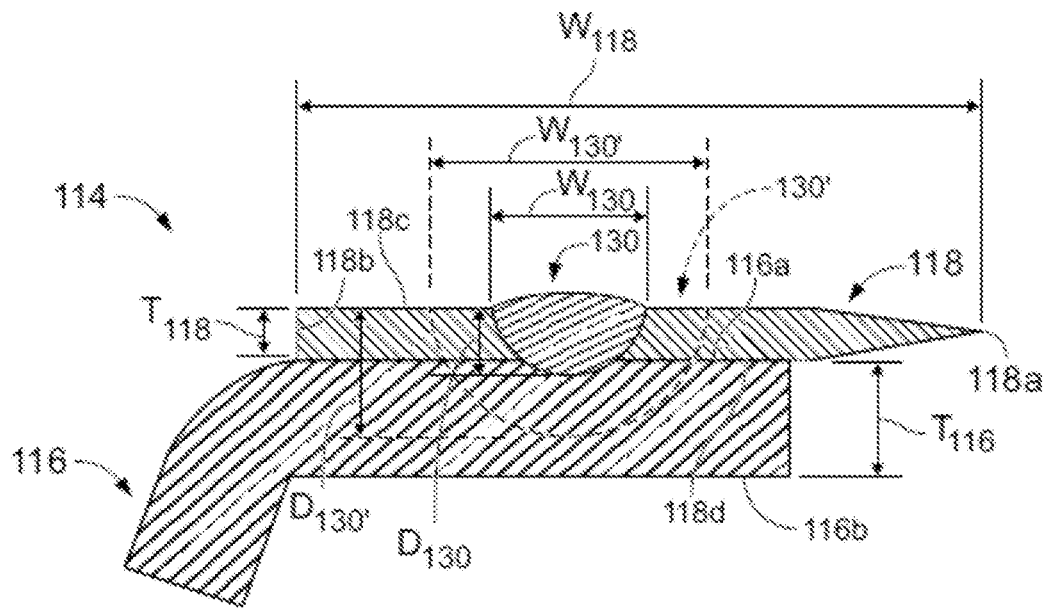
FIG. 6 is a cross-section of the razorblade assembly of FIG. 5 taken along line 6-6.

For comparison, FIGS. 5 and 6 are similar top and cross-sectional views, respectively, of a razor blade assembly 114 formed using a conventional conduction laser welding process. The razor blade assembly 114 comprises a blade support 116 coupled to a razor blade 118. The razor blade 118 may be substantially similar to the razor blade 18 shown in FIGS. 1-4 and may comprise a blade tip 118a, a back edge 118b, an upper surface 118c, a lower surface 118d, a width $W_{118}$ and a thickness $T_{118}$. The blade support 116 may be substantially similar to the blade support 16 shown in FIGS. 1-4 and may comprise an upper surface 116a, a lower surface 116b, and a thickness $T_{116}$.

The razor blade 118 is joined to the blade support 116 via one or more conventional weld areas 130 comprising a length $L_{130}$ of 0.7 mm, a width $W_{130}$ of 0.3 mm, and a depth $D_{130}$ of less than 0.15 mm. The weld area 130 may comprise a slightly elongated shape in which the length $L_{130}$ is greater than the width $W_{130}$. However, a ratio of length:width for the weld area 130 in FIG. 5 is substantially less than for the weld area 30 in FIG. 2. For example, the ratio of length:width for the weld area 130 formed using conduction laser welding is typically about 2:1, as compared to a ratio of length:width of greater than about 5:1 for the weld area 30/30'. In addition, a ratio of depth:width for the weld area 130 in FIG. 6 is significantly less than for weld area 30 in FIGS. 3A and 4. For example, the ratio of depth:width for the weld area 130 is typically about 1:2, as compared to a ratio of depth:width of greater than about 2:1 for weld area 30/30'. The weld area 130 extends into the blade support 116 by a relatively small amount relative to the width $W_{130}$. As described herein in more detail, to obtain a deeper weld using conduction laser welding, the width $W_{130}$ of the weld area 130 generally must be increased correspondingly. For example, as shown in FIG. 6, to obtain a weld area 130' (shown with dashed lines) using conduction laser welding with a depth $D_{130}'$ of 0.15 mm similar to the depth D30 of the weld area of FIGS. 3A and 3B (i.e., a depth $D_{130}'$ about twice that of the depth $D_{130}$), a width $W_{130}'$ of the weld area 130' must be increased correspondingly to a width of greater than 0.3 mm (i.e., at least doubled), which creates a very wide weld area 130'.

Unlike the weld area 30 in FIGS. 3A and 4, the width $W_{130}$ of the weld area 130 in FIG. 6 is not uniform along the depth $D_{130}$. In particular, the weld area 130 may comprise a semicircular shape in cross-section with rounded walls that curve inward toward each, such that the width $W_{130}$ decreases substantially continuously with the depth $D_{130}$. For example, the width $W_{130}$ of the weld area 130 may be greatest at the upper surface 118c of the razor blade 118 and may decrease continuously to a point of maximum depth $D_{130}$. It can be seen that the same is true for the width $W_{130}'$ of the weld area 130'.

Figure 7:
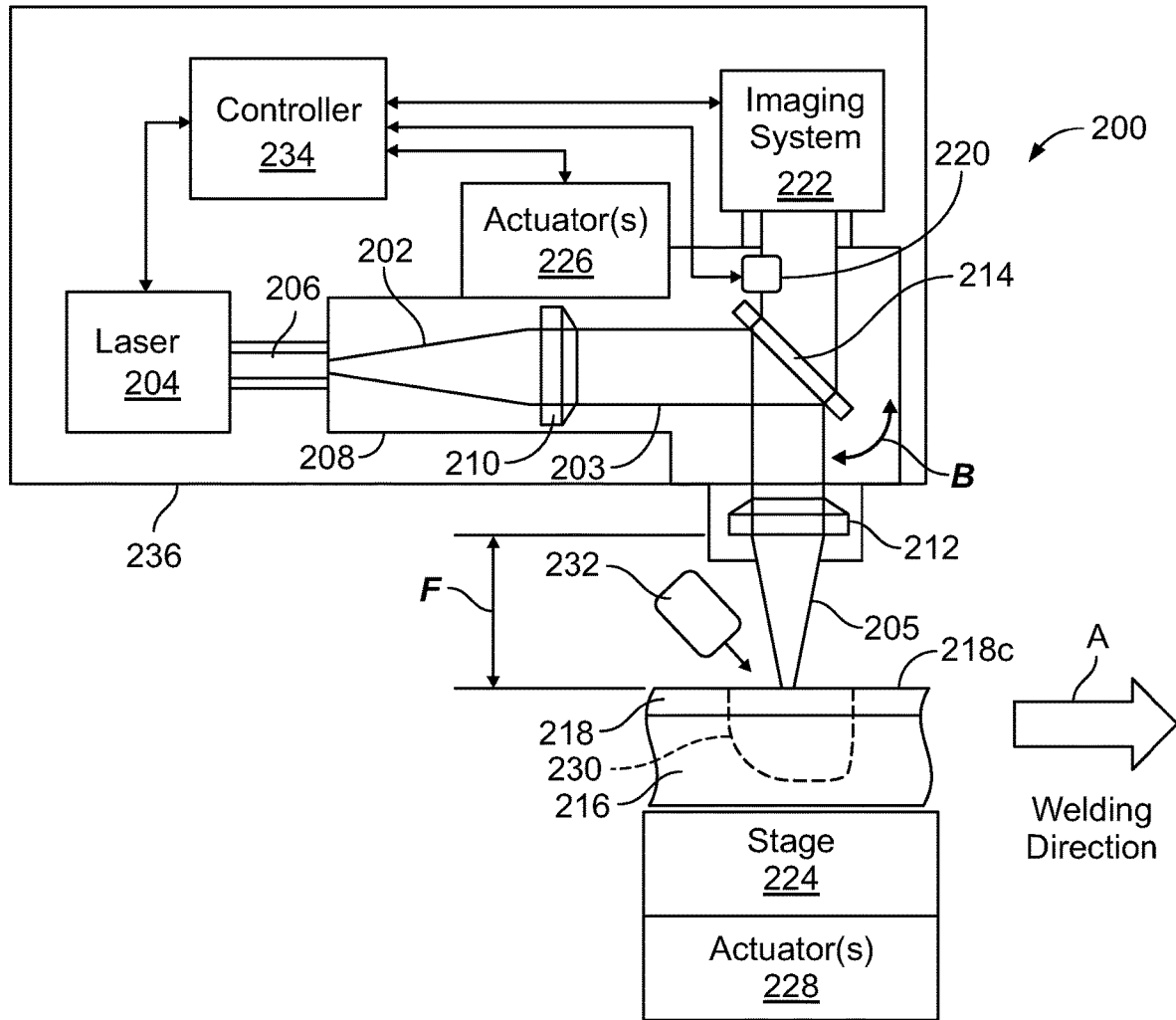
FIG. 7 is a schematic diagram of an exemplary laser scanning apparatus for performing keyhole welding, in accordance with the present disclosure.

With reference to FIG. 7, an exemplary laser scanning apparatus 200 for performing keyhole welding is depicted (some components are enlarged to show detail and are not to scale). A laser beam 202 produced by a laser 204 is transmitted via an output fiber 206 that is connected to a laser head 208. In some examples, the laser 204 may be a single-mode laser. A collimator 210 collimates the laser beam 202 produced by the laser 204 to produce a collimated laser beam 203, and a lens 212 focuses the collimated laser beam 203 to produce a focused laser beam 205. The collimator 210 may optionally comprise one or more actuators and/or mirrors (not shown) for directing and moving the collimated laser beam 203. The lens 212 may comprise a single-element lens or a multi-element lens. In some examples, the lens 212 may comprise an F-theta lens, and in one particular example, the lens 212 may comprise a telecentric F-theta lens. In other examples, the lens 212 may comprise a diffractive optical element or a holographic optical element.

A mirror 214 is coupled to an actuator 220 such that the mirror 214 is translatable and/or rotatable to direct the focused laser beam 205 to a workpiece 216, 218 and generate a weld area 230 in a welding direction indicated by arrow A. The actuator 220 may comprise, for example, a galvanometer-mirror scanner. The actuator 220 causes the mirror 214 to move in, for example, a direction indicated by arrow B, which changes the angle and/or position of the focused laser beam 205 with respect to the workpieces 216, 218. In some examples, the galvanometer-mirror scanner may comprise a 2- or 3-axis scanner. Although one mirror 214 is shown, it is understood that the laser scanning apparatus 200 may comprise two or more mirrors 214. In addition, although one actuator 220 is shown, it is understood that the laser scanning apparatus 200 may comprise two or more actuators 220 to allow movement of the mirror(s) 214 about two or more different axes. The laser scanning apparatus 200 may further comprise an imaging system 222 that is positioned to monitor one or more parameters of the workpieces 216, 218 and weld area 230. One or more nozzles 232 coupled to a gas supply (not shown) may direct a shield gas such as helium, argon, or nitrogen to the weld area 230. It may be understood that the laser scanning apparatus 200 depicted in FIG. 7 is one example and that other suitable laser scanning apparatuses may be used. For example, FIG. 7 depicts a pre-objective scanner, but a post-objective scanner may also be used, in which the lens 212 is located before the mirror(s) 214 and is coupled to a servo or other actuator.

The workpieces 216, 218 may be mounted to a stage 224 and may be fixed relative to each other in a given position. The lower workpiece 216 may be a blade support, and the upper workpiece 218 may be a razor blade, with the laser beam 205 being directed at an upper surface 218c of the razor blade 218. The laser head 208 and/or stage 224 may optionally comprise one or more respective actuators 226, 228 that allow movement of the laser head 208 and/or stage 224 and workpieces 216, 218 relative to each other in the X, Y, and/or Z directions to advance the laser beam 205 along the razor blade 218. The actuator(s) 226, 228 may include, for example, a linear motor, voice coil, or other linear translator. The actuator(s) 226, 228 may also allow tilting or pivoting of the laser head 208 and/or stage 224 and workpieces 216/218 relative to each other. Although the welding direction indicated by arrow A is depicted as proceeding from left to right in FIG. 7, it is understood that the laser scanning apparatus 200 may be configured such that welding proceeds in any desired direction, e.g., in a direction extending into or out of the page.

In some examples, the laser head 208 may be fixed such that the laser head 208 does not move relative to the stage 224 and workpieces 216, 218, with the stage 224 and workpieces 216, 218 being movable relative to the laser head 208. In other examples, the stage 224 and workpieces 216, 218 may be fixed such that the stage 224 and workpieces 216, 218 do not move relative to the laser head 208 and the laser head 208 is movable relative to the stage 224 and workpieces 216, 218, e.g., the laser head 208 may be coupled to a movable stage (not shown). In further examples, both the laser head 208 and the stage 224 and workpieces 216, 218 may be movable, such that the laser head 208 and stage 224 and workpieces 216, 218 are movable with respect to each other.

The laser scanning apparatus 200 may further comprise a controller 234 that is electrically coupled to one or more components of the laser scanning apparatus 200. For example, as shown in FIG. 7, the controller 234 is coupled to the laser 204, the imaging system 222, and the actuators 220, 226. The controller 234 may be part of a control system that receives data relating to one or more components of the laser scanning apparatus 200 and/or the workpieces 216, 218 and weld area 230 and controls operation of the components of the laser scanning apparatus 200. The controller 234 may also be coupled to, for example, the actuator(s) 228 and/or the nozzle 232, as well as any additional actuators or other components. The laser scanning apparatus 200 may be positioned at a laser welding station 236, in which the actuator 228 may comprise a moving belt or chain that feeds multiple stages 224 with workpieces 216, 218 into the laser welding station 236 for welding.

The controller 234 may alter one or more parameters of the laser scanning apparatus 200 to control one or more properties of the weld area 230. For example, the laser 204 may provide an adjustable power output that may be altered by changing an input voltage to the laser 204, which alters a power density of the laser beam 205. In some examples, while the laser beam 205 is advanced along the razor blade 218, the laser beam 205 may be applied to the razor blade 218 at a first power output (e.g., during an initiation phase) to initiate a keyhole, after which the first power output may be reduced to a second (lower) power output and the laser beam 205 may be applied to the razor blade 218 at the second power output to form the weld area 230 joining the razor blade 218 to the blade support 216 (e.g., during a welding phase; see also FIG. 8). The first power output may be, for example, between about 50% to about 500% (±5%) greater than the second power output. These steps may be repeated as desired to form one or more additional weld areas 230.

In some examples, multiple weld areas 230 may be formed by starting at one end of the razor blade 218 and forming the weld areas 230 sequentially in a direction extending along the longitudinal length (not shown; see FIG. 1) of the razor blade 218. In other examples, multiple weld areas 230 may be formed using an alternating welding pattern. In some instances, a first weld area may be formed at a longitudinal center or midpoint of the razor blade 218, a second weld area may be formed to the right of the first weld area, a third weld area may be formed to the left of the first weld area, a fourth weld area may be formed to the right of the second weld area, a fifth weld area may be formed to the left of the third weld area, and so forth, until the desired number of weld areas 230 have been formed. Other alternating patterns may be used as desired. Use of an alternating welding pattern may help to more evenly distribute the heat from welding, which may reduce heat distortion of the blade support 216 and/or the razor blade 218.

A duration of the laser beam application may also be varied to obtain a desired length and/or depth for the weld area 230. For example, a first time period during which the laser beam 205 having the first power output is applied to the razor blade 218 may differ from a second time period during which the laser beam 205 having the second power output is applied to the razor blade 218. The first time period may be between about 0.05 milliseconds (msec) to about 0.20 msec, ±0.005. In some examples, the second time period may be greater than the first time period, and in some particular examples, a ratio of first time period:second time period is greater than about 5:1, ±0.1.

Additional parameters of the laser scanning apparatus 200 that may be adjusted may include a scanning speed or speed profile within the weld area 230, a scanning speed or speed profile between weld areas 230, a focal length F (see FIG. 7), an angle of the laser beam 205 relative to the upper surface 218c of the razor blade 218 (e.g., to form the angled weld area 30' depicted in FIG. 4), a spot size, a pulse length, a shield gas type and flow velocity, a pulse power or pulse shape, or a laser beam parameter product. The scanning speed of the laser beam 205 within the weld area 230, along with the duration of laser beam application, may be selected such that an elliptical or lozenge-shaped weld area as shown in, for example, FIGS. 1, 3A, and 3B, is formed with the properties described herein. For example, the scanning speed and/or other parameters of the laser beam 205 may be selected such that the weld area 230 comprises a width that is uniform along substantially an entirety of a depth, as described herein (not shown in FIG. 7; see reference numerals $W_{30}$ and $D_{30}$ in FIGS. 3A and 3B).

In some examples, the laser beam 205 may be advanced along the razor blade 218 at a speed of at least 800 mm/second, and in some examples, at least 1000 mm/second. For example, with a scanning speed of 1000 mm/second, a weld area 230 with a length of 0.70 mm may be formed in 0.70 msec (0.05-0.20 msec at the first power output and 0.50-0.65 msec at the second power output). A maximum scanning speed between multiple weld areas 230 may be selected such that the scanning speed within each additional weld area 230 is uniform and such that heat distortion of the razor blade 218 and blade support 216 is minimized. In some examples, the scanning speed of laser beam 205 may remain substantially constant throughout the entire welding process. In other examples, the scanning speed of the laser beam 205 may vary during the welding process. For instance, the scanning speed of the laser beam 205 within the weld area 230 may be different from the scanning speed between weld areas 230 and/or the scanning speed of the laser beam 205 during the initiation phase (i.e., at the first power output) may be different from the scanning speed during the welding phase (i.e., at the second power output).

Figure 8:
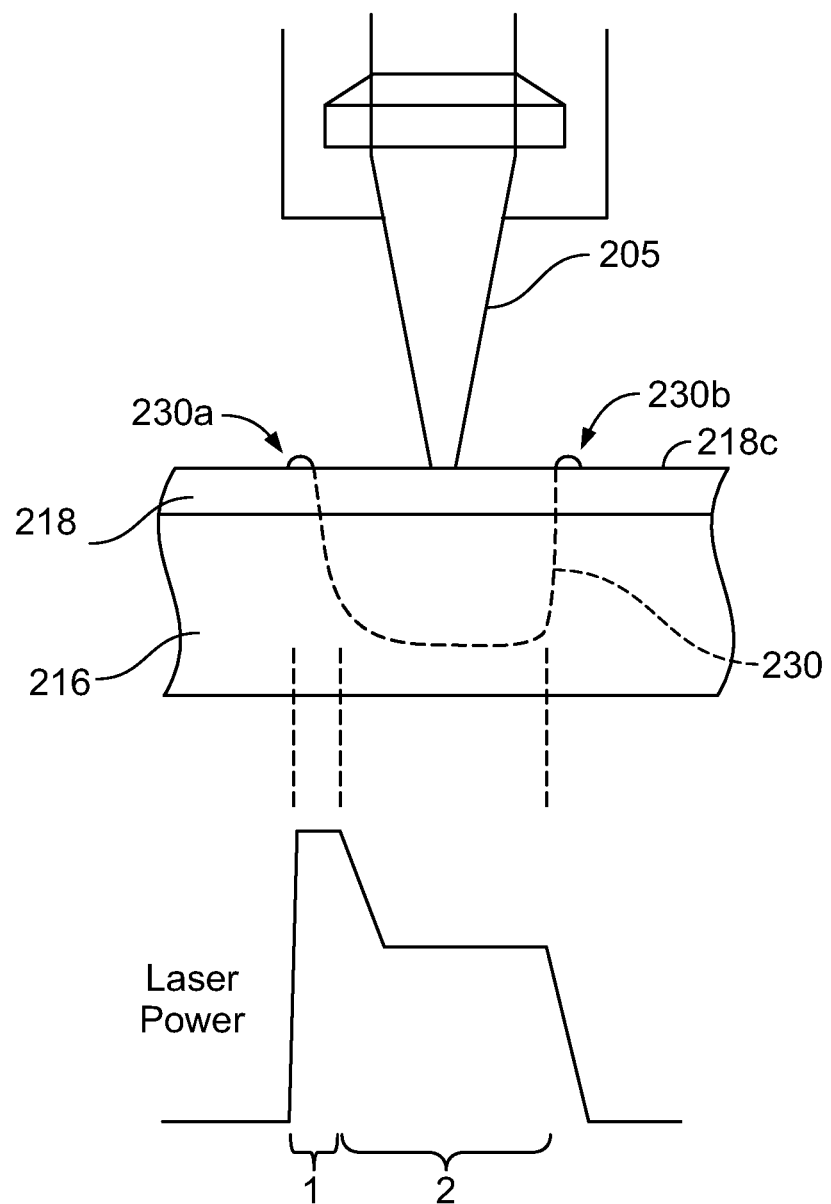
FIG. 8 is an enlarged view of a portion of FIG. 7 depicting an interface between the laser beam and the workpiece and a graph illustrating a laser pulse shape, in accordance with the present disclosure.

FIG. 8 is an enlarged view of an interface between the laser beam 205 and the workpieces 216, 218 of FIG. 7, in which a graph is provided to illustrate a correspondence between the power output of the laser 204 and the formation of the weld area 230. Shaping of the laser pulse (e.g., by modulating the power output) during keyhole welding may be used to optimize parameters of the weld area 230. Pulse shaping may be particularly useful to avoid or minimize protrusions 230*a*, 230*b* of metal at a beginning and/or end of the weld area 230, which may be created due to, for example, ejection and spattering of metal during keyhole welding. Large protrusions 230*a*, 230*b* that extend above the upper surface 218*c* of the razor blade 218 may interfere with stacking and/or feeding of the razor blade assemblies. Accordingly, it is desirable to keep the upper surface 218*c* of the razor blade 218 as flat (i.e., planar) as possible and substantially free of asperities such as burrs, spikes, and other projections.

It may be expected that a pulse shape with a lower-power initiation phase, followed by a higher-power welding phase, would reduce the protrusions at the beginning and end of the weld area. However, it was surprisingly found that the lower-to-higher pulse shape produced protrusions that extended above the upper surface of the razor blade by an amount that interfered with stacking/feeding of the razor blade assemblies. It was found that a pulse shape with a short duration, high-power initiation phase, followed by a longer duration, lower-power welding phase, as shown in FIG. 8, produces a weld area 230 with protrusions 230*a*, 230*b* that do not interfere with stacking/feeding of the razor blade assemblies. For example, a weld area produced by a keyhole welding process in accordance with the parameters in FIG. 8 comprises protrusions that extend above the surface of the razor blade by no more than 0.025 mm, and preferably no more than 0.0075 mm.

Weld areas produced in accordance with the present disclosure exhibit greater weld retention strength, i.e., an amount of force required to separate the razor blade from the blade support following welding, as compared to weld areas with a comparable depth produced using conventional conduction laser welding. It was found that the retention strength of a conventional weld area, e.g., weld area 130 in FIG. 6, was significantly less than the retention strength of a weld area in accordance with the present disclosure, e.g., weld area 30/30' in FIGS. 3A, 3B, and 4, comprising a similar depth and a weld junction with a similar (or smaller) surface area. A weld area produced using a keyhole welding method in accordance with the present disclosure may exhibit a weld retention strength that is at least 30% greater, or at least 50% greater than a weld retention strength of a weld area produced using conventional conduction laser welding. In some examples, a razor blade assembly produced using conventional conduction laser welding may exhibit a weld retention strength of between about 120 N to about 150 N, while a comparable razor blade assembly produced in accordance with the present disclosure may exhibit a weld retention strength of about 180 N to 200 N. In one example, the weld retention strength of a conventional razor blade assembly comprising weld areas produced using conventional conduction laser welding is 146.65 N (±8.04 N), and the weld retention strength of a razor blade assembly comprising weld areas produced in accordance with the present disclosure is 191.28 (±5.81 N).

In general, as compared to conduction laser welding, keyhole welding in accordance with the present disclosure produces a stronger weld and is generally less susceptible to process variation. Keyhole welding is faster and more efficient, which enables greater output and reduces cost, and can tolerate more variations in the properties of the laser. Some conventional techniques utilize welding masks to control the location of the weld areas and/or to act as a heat sink. The increased efficiency of keyhole welding allows a reduction in the total amount of energy (i.e., heat) that is applied to the workpiece, which reduces heat distortion and eliminates the need for masks. Use of galvanometer-mirror scanners and other precision scanners provides more accurate and consistent placement of the laser beam and further eliminates the need for masks to define the placement of the weld areas. Use of precision scanners also reduces or eliminates the need for mechanical linkages to move the laser head and/or workpiece stage, which are more prone to failure, require considerable maintenance, and can introduce defects and discontinuities to the weld.

Weld areas produced in accordance with the present disclosure have a much higher ratio of depth:width, as compared to weld areas produced using conventional conduction laser welding (e.g., greater than about 2:1 for keyhole welding and about 1:1 for conduction laser welding). Increasing the depth of a weld area produced by conduction laser welding requires increasing an overall volume of melted material, with each increase in depth of the weld area generally requiring an equal or greater increase in width. The amount of heat required to achieve this increased depth frequently results in unacceptable amounts of heat distortion of the workpiece. With keyhole welding, increasing the depth of the weld area generally requires little or no increase in the width and reduces heat distortion of the workpiece. Unlike conventional conduction laser welding, which relies on surface heating and permits little or no directionality other than perpendicular to the workpiece surface, keyhole welding permits formation of precision welds that are angled relative to the workpiece surface.

Use of keyhole welding may generally provide greater flexibility when manufacturing razor blade assemblies. A razor blade assembly made using conventional conduction laser welding typically comprises 13 weld areas of a given length, width, and depth and possesses a given weld retention strength. A razor blade assembly comprising weld areas in accordance with the present disclosure may achieve a comparable weld retention strength with, for example, fewer total weld areas that are longer, deeper, and/or angled, without causing undesirable amounts of heat distortion or significantly increasing the width of the weld area. Keyhole welding may be used with, for example, narrower razor blades and/or blade supports, which may permit installation of a greater number of razor blade assemblies per razor cartridge.

Figure 9:
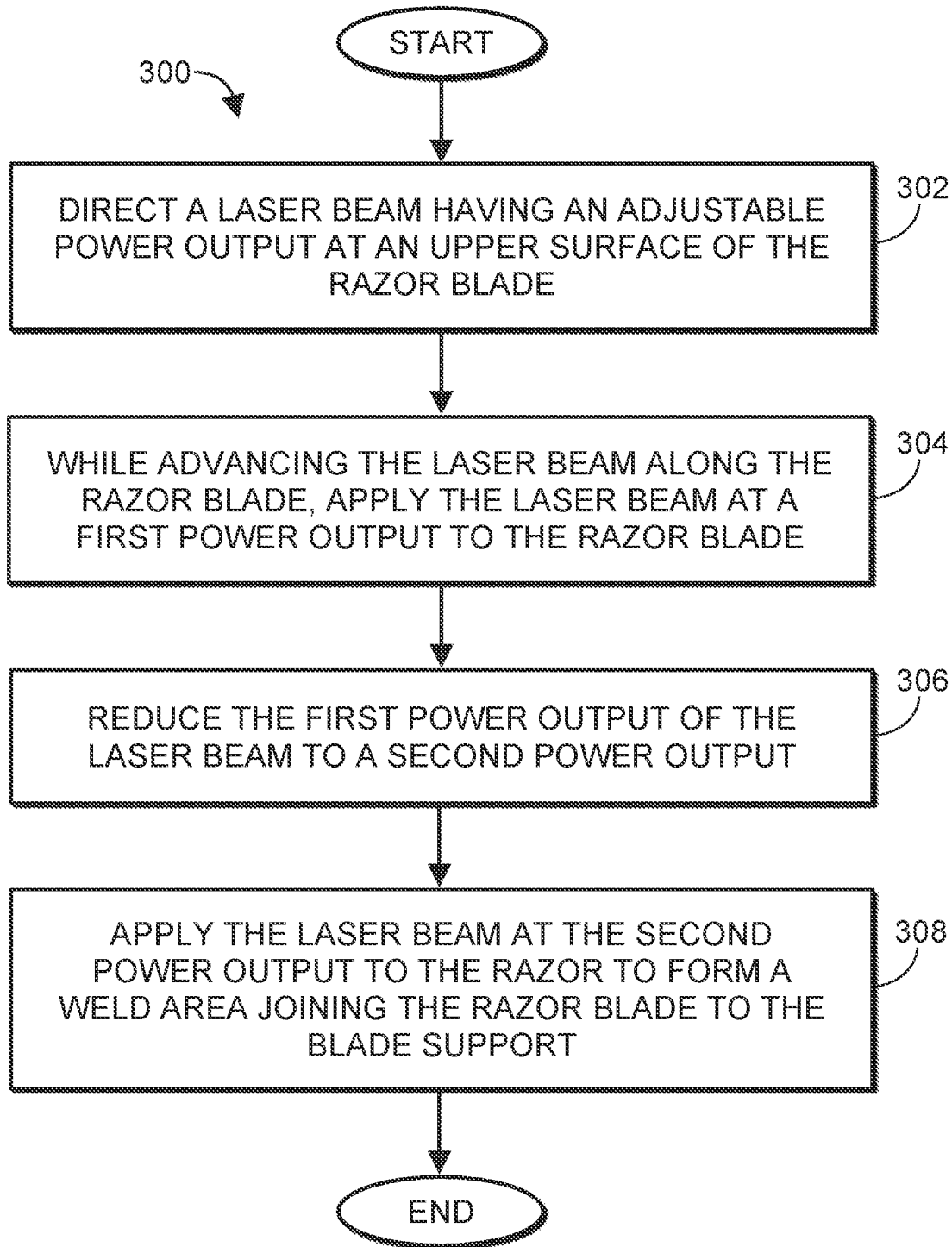
FIGS. 9 and 10 are flow diagrams illustrating exemplary methods of joining a razor blade to a blade support to form a razor blade assembly, in accordance with the present disclosure.
Figure 10:
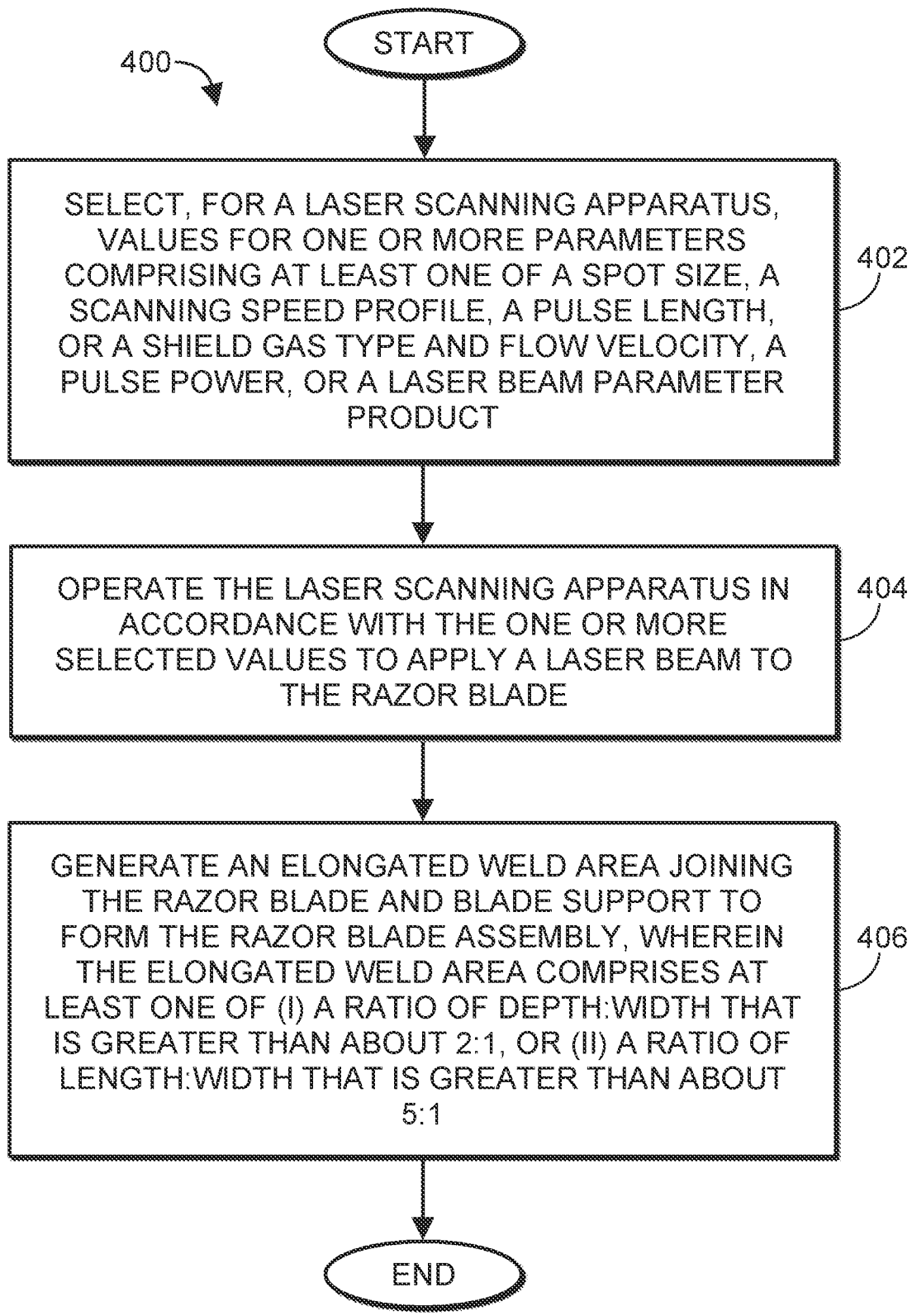

FIGS. 9 and 10 are flow diagrams illustrating exemplary methods of joining a razor blade to a blade support to form a razor blade assembly in accordance with the present disclosure. With reference to FIG. 9, an exemplary method 300 of joining a razor blade to a blade support to form a razor blade assembly includes directing a laser beam having an adjustable power output at an upper surface of the razor blade at Step 302. At Step 304, while advancing the laser beam along the razor blade, the laser beam is applied at a first power output to the razor blade. Step 306 includes reducing the first power output of the laser beam to a second power output, and Step 308 includes applying the laser beam at the second power output to the razor to form a weld area joining the razor blade to the blade support, after which the method 300 may conclude.

With reference to FIG. 10, an exemplary method 400 of joining a razor blade to a blade support to form a razor blade assembly includes selecting, for a laser scanning apparatus, values for one or more parameters comprising at least one of a spot size, a scanning speed profile, a pulse length, or a shield gas type and flow velocity, a pulse power, or a laser beam parameter product at Step 402. Step 404 includes operating the laser scanning apparatus in accordance with the one or more selected values to apply a laser beam to the razor blade, and Step 406 includes generating an elongated weld area joining the razor blade and blade support to form the razor blade assembly, wherein the elongated weld area comprises at least one of (i) a ratio of depth:width that is greater than about 2:1, or (ii) a ratio of length:width that is greater than about 5:1, after which the method may conclude.

Representative embodiments of the present disclosure described above can be described as follows:

A. A razor blade assembly comprising:
a razor blade;
a blade support; and
one or more weld areas joining the razor blade to the blade support, each weld area having a length and a width, wherein the width is about 0.05 mm to about 0.15 mm.

B. The razor blade assembly of paragraph A, wherein the length of each weld area is greater than the width of each weld area to define an elongated shape.

C. The razor blade assembly of paragraph A or B, wherein at least one of the one or more weld areas comprises a ratio of length:width that is greater than about 5:1.

D. The razor blade assembly of any of paragraphs A to C, wherein each weld area comprises a substantially elliptical or lozenge shape.

E. The razor blade assembly of any of paragraphs A to D, wherein the razor blade comprises a width from a tip to a back of from about 0.20 mm to about 1.50 mm.

F. The razor blade assembly of any of paragraphs A to E, wherein each weld area further comprises a depth and wherein the width of each weld area is uniform along substantially an entirety of the length.

G. The razor blade assembly of any of paragraphs A to F, wherein the one or more weld areas comprise a plurality of weld areas spaced apart along a longitudinal length of the razor blade.

H. A razor blade assembly comprising:
a razor blade;
a blade support; and
one or more weld areas joining the razor blade to the blade support, each weld area comprising a depth and a width, wherein the depth is about 0.10 mm to about 0.20 mm.

The razor blade assembly of paragraph H, wherein the width of each weld area is about 0.05 mm to about 0.15 mm.

J. The razor blade assembly of paragraph H or I, wherein at least one of the one or more weld areas comprises a ratio of depth:width that is greater than about 2:1.

K. The razor blade assembly of paragraphs H to J, wherein a weld face of each weld area protrudes above an upper surface of the razor blade by no more than 0.025 mm.

L. The razor blade assembly of any of paragraphs H to K, wherein each weld area extends from an upper surface of the razor blade into the blade support.

M. The razor blade assembly of paragraph L, wherein at least one of the one or more weld areas extends at least halfway through a thickness of the blade support.

N. The razor blade assembly of paragraph L or M, wherein each weld area comprises a first side wall and a second side wall, the first and second side walls being parallel to each other.

O. The razor blade assembly of paragraph N, wherein the first and second side walls extend through the razor blade in a direction that is substantially perpendicular to the upper surface of the razor blade.

P. The razor blade assembly of paragraph N or O, wherein the first and second side walls extend through the razor blade at an acute angle with respect to the upper surface of the razor blade.

Q. The razor blade assembly of any of paragraphs H to P, wherein the width of each weld area is uniform along substantially an entirety of the depth.

R. The razor blade assembly of any of paragraphs H to Q, wherein a thickness of the blade support is from about 0.10 mm to about 0.30 mm.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor blade assembly comprising:
a razor blade;
a blade support; and
one or more weld areas joining the razor blade to the blade support, said one or more weld areas having a height, a length, and a width, wherein the width is from about 0.05 mm to 0.15 mm, wherein the one weld area or at least one of the more weld areas is not uniform in the height along the length, and wherein the one or more weld areas comprise protrusions that extend from a surface of the razor blade by no more than 0.025 mm.

2. The razor blade assembly of claim 1, wherein the length of said one or more weld areas is greater than the width of said one or more weld areas to define an elongated shape.

3. The razor blade assembly of claim 2, wherein the one weld area or at least one of the more weld areas comprises a ratio of length:width that is greater than 5.1:1.

4. The razor blade assembly of claim 2, wherein said one or more weld areas comprises a substantially elliptical shape.

5. The razor blade assembly of claim 1, wherein the razor blade comprises a width from a tip to a back of from about 0.20 mm to about 1.50 mm.

6. The razor blade assembly of claim 1, wherein the one or more weld areas comprise a plurality of weld areas spaced apart along a longitudinal length of the razor blade.

7. A razor blade assembly comprising:
a razor blade;
a blade support; and
one or more weld areas, the one or more welds areas joining the razor blade to the blade support, wherein the one or more weld areas comprise a height, a length, a depth and a width, wherein the width is from about 0.05 mm to 0.15 mm and the depth is from about 0.10 mm to about 0.20 mm, wherein the one weld area or at least one of the more weld areas is not uniform in the height along the length, and wherein the one or more weld areas comprise protrusions that extend from a surface of the razor blade by no more than 0.025 mm.

8. The razor blade assembly of claim 7, wherein the one weld area or at least one of the more weld areas comprises a ratio of depth:width that is greater than 2.1:1.

9. The razor blade assembly of claim 7, wherein the one weld area or at least one of the more weld areas extends at least halfway through a thickness of the blade support.

10. The razor blade assembly of of claim 7, wherein said one or more weld areas comprises a first side wall and a second side wall, the first and second side walls being parallel to each other.

11. The razor blade assembly of claim 7, wherein a thickness of the blade support is from about 0.10 mm to about 0.30 mm.

* * * * *